United States Patent
Hamade et al.

(10) Patent No.: US 11,667,808 B2
(45) Date of Patent: Jun. 6, 2023

(54) HYDROPHILIC COATING MATERIAL, METHOD FOR PRODUCING THE SAME AND INKJET RECORDING HEAD

(71) Applicant: CANON KABUSHIKI KAISHA, Tokyo (JP)

(72) Inventors: Yohei Hamade, Tokyo (JP); Satoshi Tsutsui, Yokohama (JP); Isamu Horiuchi, Yokohama (JP); Kazunari Ishizuka, Suntou-gun (JP); Miho Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 16/909,304

(22) Filed: Jun. 23, 2020

(65) Prior Publication Data

US 2020/0407589 A1 Dec. 31, 2020

(30) Foreign Application Priority Data

Jun. 26, 2019 (JP) .............................. JP2019-118518

(51) Int. Cl.
*C09D 163/00* (2006.01)
*B41J 2/14* (2006.01)
*C09D 11/38* (2014.01)

(52) U.S. Cl.
CPC .......... *C09D 163/00* (2013.01); *B41J 2/1433* (2013.01); *C09D 11/38* (2013.01)

(58) Field of Classification Search
CPC .... B41J 2/1645; C09D 163/00; C09D 135/00; C09D 5/00; C09D 11/38; C09D 133/26
See application file for complete search history.

(56) References Cited

U.S. PATENT DOCUMENTS

| 4,908,075 A * | 3/1990 | Yamasoe ................. C09D 1/04 148/265 |
| 2006/0193789 A1* | 8/2006 | Tamarkin ............... A61K 8/046 424/70.13 |
| 2007/0286959 A1* | 12/2007 | Palmer ................. C09D 175/04 106/206.1 |
| 2007/0299177 A1* | 12/2007 | Serobian ............... C09D 5/008 524/556 |
| 2008/0070008 A1* | 3/2008 | Namba ................ B41J 2/14274 347/100 |
| 2008/0292560 A1* | 11/2008 | Tamarkin ............... A61K 8/731 424/45 |
| 2010/0243221 A1* | 9/2010 | Yamasaki ............ C09D 201/10 524/588 |
| 2012/0121831 A1* | 5/2012 | Kudoh ................... C09D 11/32 524/168 |

FOREIGN PATENT DOCUMENTS

| JP | H03-215589 A | 9/1991 |
| JP | 2001-105599 A | 4/2001 |
| JP | 2006-306031 A | 11/2006 |
| JP | 2013-240919 A | 12/2013 |

* cited by examiner

*Primary Examiner* — John Zimmermann
(74) *Attorney, Agent, or Firm* — Canon U.S.A., Inc., IP Division

(57) ABSTRACT

A hydrophilic coating material including an alginate compound having a bond with a silane compound is used. The material is produced by reacting a water-soluble alginate compound and a silane compound and then by adding a divalent metal ion to an alginic acid-derived carboxyl group in the reaction product.

18 Claims, 2 Drawing Sheets

HYDROPHILIC COATING MATERIAL, METHOD FOR PRODUCING THE SAME AND INKJET RECORDING HEAD

BACKGROUND OF THE INVENTION

Field of the Invention

The present disclosure relates to a hydrophilic coating material and a method for producing the material. The present disclosure also relates to an inkjet recording head including the hydrophilic coating material.

Description of the Related Art

In recent years, a technique of hydrophilizing a substrate surface is demanded in the industrial world mainly including the paint and film fields. By hydrophilizing a substrate surface, functions such as antifogging properties, antistatic properties and antifouling properties can be imparted. Specifically, in the inkjet printer field, hydrophilization treatment of an ejection orifice face should increase the degree of freedom of inks, and, for example, various types of inks should be usable.

As the hydrophilization treatment method, various methods have been developed. As physical surface treatment methods, corona treatment, plasma treatment, ultraviolet treatment and similar methods are known. As a chemical treatment method, a surface modification method using sulfuric acid, nitric acid, liquid fuming sulfuric acid, gaseous sulfur trioxide or the like is known. In addition, Japanese Patent Application Laid-Open No. H03-215589 discloses a method of using a surfactant or the like for a method of adding a hydrophilizing agent to a resin or a method of coating a resin surface with a hydrophilic substance.

SUMMARY OF THE INVENTION

The present disclosure relates to a hydrophilic coating material including an alginate compound having a bond with a silane compound.

Further features of the present disclosure will become apparent from the following description of exemplary embodiments with reference to the attached drawings.

DESCRIPTION OF THE EMBODIMENTS

Figure 1A:
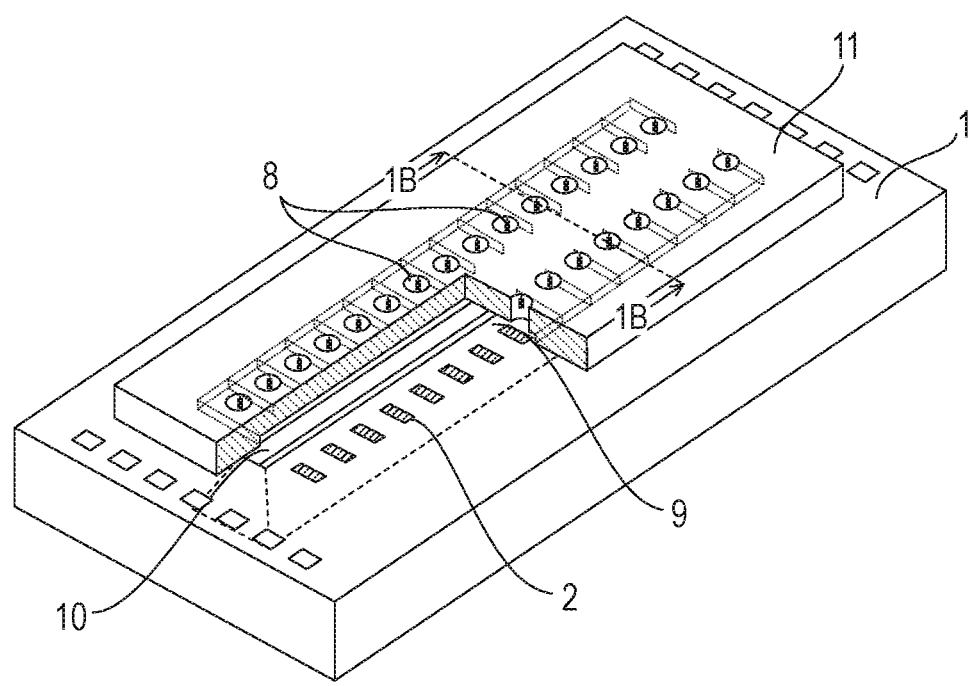
FIG. 1A is a partially broken perspective view schematically showing an inkjet recording head pertaining to the present disclosure.

According to studies by the inventors of the present disclosure, conventional hydrophilization treatment methods include the following disadvantages. In the above physical and chemical treatment methods, the orientation of a hydroxy group as the hydrophilic group fails to be maintained with time, and the hydrophilicity decreases. In such a hydrophilization treatment method using a surfactant as disclosed in Japanese Patent Application Laid-Open No. H03-215589, an external factor such as scratching causes the surfactant to bleed out, and the hydrophilicity is not maintained. When the surfactant is used in a larger amount in order to improve the initial hydrophilicity, moisture absorption causes a resin to swell, or the mechanical strength decreases, for example.

The present disclosure is intended to provide a hydrophilic coating material capable of giving a coated film having excellent hydrophilicity on a material surface and having excellent durability of hardness and hydrophilicity.

The hydrophilic coating material pertaining to the present disclosure is a hydrophilic coating material including an alginate compound having a bond with a silane compound.

Alginic acid is a polysaccharide and is a hydrophilic polymer having very high water capacity and having high hydrophilic durability. Hence, alginic acid is useful as a hydrophilizing material but is a soft gel substance and thus has poor durability.

In the present disclosure, by bonding an alginate compound with a silane compound, mechanical strength is imparted while functions including hydrophilicity and hydrophilic durability are maintained. In general, a silane compound is a high affinity compound regardless of an organic compound or an inorganic compound and is suitable to impart functionalities such as durability. An alginate compound is known to exhibit markedly higher mechanical strength when made into an alginate salt containing a divalent metal ion. This is because two alginic acid molecules are ionically crosslinked through a divalent metal ion into a gel. In the hydrophilic coating material pertaining to the present disclosure, the alginate compound is preferably an alginate salt, and the cation of the alginate salt is preferably a divalent metal ion. An alginate salt containing a divalent metal ion as the cation is difficult to react with a silane compound, and thus the hydrophilic coating material is preferably produced by the following production method.

In other words, in a method for producing a hydrophilic coating material pertaining to the present disclosure, an alginate compound is reacted with a silane compound while the hydrophilicity of alginic acid is not impaired. Embodiments of the present disclosure will now be described in detail.

The method for producing a hydrophilic coating material pertaining to the present disclosure includes the following steps.

(A) A step of reacting an alginate compound and a silane compound.

Preferably, subsequent to the step (A), a step (B) below is performed.

(B) A step of adding a divalent metal ion to an alginic acid-derived carboxyl group in the reaction product.

(A) a Step of Reacting an Alginate Compound and a Silane Compound

First, an alginate compound and a silane compound are reacted and bonded. The reaction is preferably performed in an appropriate solvent and is more preferably performed in a solvent capable of dissolving both the compounds. The solvent is preferably an aqueous solvent. Accordingly, a water-soluble alginate compound is preferably used, and an alginate salt containing a monovalent cation is more preferably used. This is because an alginate salt containing a divalent or higher valent cation has poor solubility in water and thus is unsuitable for the reaction with a silane compound, which is typically easily soluble in water. Alginic acid itself also has poor solubility in water and thus is unsuitable.

Specifically, preferred examples of the water-soluble alginate compound include sodium alginate, potassium alginate and ammonium alginate. In addition, alginate esters such as propylene glycol alginate, which have water-solubility, can also be preferably used as the water-soluble alginate compound. For the reaction, the silane compound is preferably added to an aqueous solution of the alginate compound to perform the reaction. For the reaction, the solid content concentration of the alginate compound in the aqueous solution is preferably 0.1 to 10% by mass in consideration of solubility or reactivity with the silane compound.

As for the molecular weight of the alginate compound, a relatively low molecular weight is preferred in consideration of the reaction with the silane compound. Although an alginate compound in natural brown algae as the material of the alginate compound has a molecular weight of about several millions, a commercially available water-soluble alginate compound extracted therefrom has a molecular weight of several tens of thousands and can be preferably used.

As the silane compound, a silane compound having a functional group capable of easily reacting with a carboxyl group or a hydroxy group, which is a functional group of the alginate compound, can be preferably used. Specifically, the carboxyl group of the alginate compound exhibits hydrophilicity, and thus a silane compound having a functional group capable of more actively reacting with a hydroxy group than a carboxyl group is preferably selected. Examples of the functional group capable of easily reacting with a hydroxy group include an amide group and a carboxyl group. Specific examples of the silane compound having such a functional group include 3-trimethylsilylpropionic acid and N-(3-triethoxysilylpropyl)-4-hydroxybutyramide.

These silane compounds having an amide group or a carboxyl group may be used singly or in combination of two or more of them. At least one amide group-containing silane compound and at least one carboxyl group-containing silane compound may be used in combination. In order to satisfy satisfactory hydrophilicity and hydrophilic durability in combination, the amount of the silane compound to be reacted is preferably 50 to 98% by mass relative to 100% by mass of the alginate compound and the silane compound in total. The amount of the alginate compound is preferably 2 to 50% by mass relative to 100% by mass of the alginate compound and the silane compound in total.

Depending on the application purposes, the silane compound may be used in combination with a functionalized silane. Specifically, an epoxy group-containing silane, an acrylic group-containing silane or an amino group-containing silane can be used, for example. In particular, when optical patterning is performed for a hydrophilic coating film as described later, an epoxy group-containing silane is preferred. In order to improve the mechanical strength of a coating material, these silane compounds are preferably condensed. Such a functionalized silane may be added together with the silane compound to be reacted with the alginate compound to perform the condensation between the silane compounds concurrently with the reaction with the alginate compound. Alternatively, after the step (B) of adding a divalent metal ion described later, a functionalized silane may be added.

When an amide group-containing compound is used as the silane compound in the reaction between the alginate compound and the silane compound, esterification is performed in the presence of a catalyst. As the esterification catalyst, a nickel catalyst is useful, and, for example, a commercial product, stabilized nickel catalyst "SN-250" (grade name, manufactured by Sakai Chemical Industry) can be preferably used. The amount of the esterification catalyst can be appropriately selected from a range of 0.1 to 15.0% by mass relative to 100% by mass of the alginate compound and the silane compound in total in accordance with reaction rates.

When a carboxyl group-containing compound is used as the silane compound, dehydration reaction is performed in the presence of a catalyst. As the dehydration catalyst, concentrated sulfuric acid can be preferably used. If a catalyst having a higher catalytic function than that of the concentrated sulfuric acid is used, the silane compound is highly probably reacted with a carboxyl group of alginic acid to reduce the hydrophilicity, and thus such a catalyst is unfavorable. The amount of the dehydration catalyst can be appropriately selected from a range of 0.1 to 15.0% by mass relative to 100% by mass of the alginate compound and the silane compound in total in accordance with reaction rates.

To perform such esterification or dehydration reaction, the reaction mixture may be stirred under heat.

(B) A Step of Adding a Divalent Metal Ion to the Alginate Compound

In the step (B), a divalent metal ion is added to the alginate compound bonded with silane and prepared in the step (A). For the addition, the reaction is performed with water to facilitate the salt exchange of a monovalent metal ion of the alginate salt for a divalent metal ion. Of the divalent metal ions, an alkaline earth metal ion having high reactivity with alginic acid, specifically, a strontium ion or a calcium ion is preferably used. As the divalent metal compound used for the salt exchange, a water-soluble divalent metal salt such as calcium chloride and strontium chloride is preferably used. In the step, an alginic acid bonded with silane is unlikely to undergo the reaction due to steric hindrance, and thus the reaction mixture may be stirred for a longer time or may be heated and stirred.

The hydrophilic coating material produced as above can be applied onto a member surface that is intended to be subjected to hydrophilization treatment, and the coating film can be cured, yielding a hydrophilic coating film. The coating method can be any known coating method. Particularly preferred is a method of easily forming a coating film having a uniform film thickness. For example, spin coating or slit coating can be used.

The member surface that is intended to be subjected to hydrophilization treatment may be subjected to a known surface treatment, before the formation of the hydrophilic coating film, to improve the adhesion to the hydrophilic coating material. Examples of the surface treatment method include corona treatment and coupling treatment.

A process of forming a hydrophilic coating film on a nozzle plate around ejection orifices of an inkjet recording head will next be described with reference to drawings.

Figure 1B:
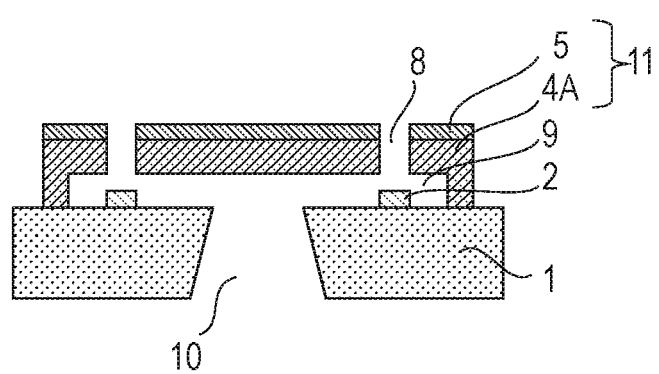
FIG. 1B is a sectional view schematically showing the inkjet recording head.

FIGS. 1A and 1B are views illustrating the structure of an inkjet recording head. FIG. 1A is a partially broken schematic perspective view, and FIG. 1B is a schematic sectional view taken along the line 1B-1B in FIG. 1A.

As shown in FIG. 1A, an inkjet recording head includes, on a head substrate 1 (also simply called substrate) having energy generating elements 2 for generating energy to eject an ink, a nozzle plate 11 having ejection orifices 8. The inkjet recording head also includes an ink flow channel 9 that communicates with the ejection orifices 8 and faces the surface of the substrate on which the energy generating elements are formed. The inkjet recording head further includes an ink supply port 10 for supplying an ink to the ink flow channel 9. The ink supply port 10 penetrates the substrate 1 and is to supply a liquid from a face opposite to the face on which the nozzle plate 11 is formed.

As shown in FIG. 1B, the nozzle plate 11 has, on a resin layer 4A, a hydrophilic coating film 5 including the hydrophilic coating material pertaining to the present disclosure. FIG. 1B shows a structure in which the hydrophilic coating film 5 is formed on the whole area of the surface of the nozzle plate (also called nozzle face), but a hydrophilic coating film may be partially formed. In this case, a hydrophilic coating film may be first formed on the whole area of a nozzle face, and then patterning may be performed. Alternatively, a water repellent film may be partially formed on a hydrophilic coating film 5, and accordingly hydrophilic portions and water-repellent portions may be mixed on a nozzle face. The film thickness of the hydrophilic coating film is not limited to particular values and is preferably 0.1 µm or more to 100 µm or less and more preferably 0.3 µm or more to 50 µm or less.

To remove an ink adhering onto the nozzle face, a wiping means such as a rubber blade may be used to wipe the face at regular or irregular intervals. The hydrophilic coating film pertaining to the present disclosure has excellent mechanical strength, and thus the hydrophilicity can be prevented from deteriorating even when such wiping is performed.

Examples and comparative examples will next be described, but the present invention is not limited thereto. For evaluations, hydrophilic coating films formed on sample substrates (only surface treatment was performed in Comparative Example 1) and inkjet recording heads (only in Examples 4 and 5 and Comparative Example 1) were prepared, and performance evaluations were performed. Materials used, preparation conditions and the like are shown in Table 2. The substrate to be used for an evaluation film may be made from any material and may be, for example, a silicon substrate, a silicon substrate with a thermal oxide film or a polyimide substrate, but a silicon substrate was used.

Example 1

<Preparation of Coating Liquid of Hydrophilic Coating Material>

A hydrophilic coating material was prepared by the following procedure.

First, sodium alginate (manufactured by Hayashi Pure Chemical Industry) was prepared as a water-soluble alginate salt. Next, 5.0 g of sodium alginate, 95.0 g of 3-trimethylsilylpropionic acid (manufactured by Tokyo Chemical Industry), 1.0 g of concentrated sulfuric acid (manufactured by FUJIFILM Wako Pure Chemical) and 100 g of ultrapure water (manufactured by FUJIFILM Wako Pure Chemical) were placed in a flask. The mixture was then heated and stirred at 80° C. for 1 hour with a hot stirrer. After completion of the reaction, the concentrated sulfuric acid was removed by water washing until the pH reached 7, and the residual water was removed with an evaporator (step (A)).

Next, to the total amount (about 100 g) of the compound obtained in the step (A), 50 g of a 1.0% by mass aqueous calcium chloride solution was added, and the whole was stirred for 1 hour to give a coating liquid of a hydrophilic coating material.

<Preparation of Hydrophilic Coating Film>

Next, a hydrophilic coating film was prepared by the following method.

The coating liquid obtained above was applied by spin coating onto a substrate so as to give a film thickness of 0.5 µm, and the coating was treated with heat at 90° C. for 5 minutes to give a coating film. The coating film was cured by heating at 200° C. for 1 hour, giving a hydrophilic coating film.

Examples 2, 3 and 6

<Preparation of Coating Liquid of Hydrophilic Coating Material>

The same procedure as in Example 1 was performed except that various conditions of the alginate compound, the silane compound, the catalyst and the divalent metal salt were changed as shown in Table 2, giving a coating liquid of a hydrophilic coating material. In Example 3, no concentrated sulfuric acid was used, and thus water washing was not performed. In addition, after preparation of the coating liquid, the Ni catalyst was removed by a catalyst recovery filter.

<Preparation of Hydrophilic Coating Film>

The same procedure as in Example 1 was performed to give a hydrophilic coating film.

Examples 4 and 5

<Preparation of Coating Liquid of Hydrophilic Coating Material>

By changing various conditions of the alginate salt, the silane compound, the catalyst, the divalent metal salt, the photocuring catalyst and other additives in Example 1 to those as shown in Table 2, a coating liquid of a hydrophilic coating material was prepared.

<Preparation of Hydrophilic Coating Film>

The obtained coating liquid of the hydrophilic coating material was applied onto a substrate by spin coating so as to give a film thickness of 500 nm, and the coating was treated with heat at 90° C. for 5 minutes to give a coating film. Next, the coating film on the substrate was exposed by an exposure apparatus (trade name: UX3000, manufactured by USHIO) at an exposure amount of 2,500 J/m$^2$ and then was treated with heat at 90° C. for 4 minutes. The coating film was further heated at 200° C. for 1 hour to be cured, giving a hydrophilic coating film.

<Preparation of Inkjet Recording Head>

An inkjet recording head was next prepared by the following method. The preparation flow is shown in FIGS. 2A to 2F. FIGS. 2A to 2F show cross sections taken along the line 1B-1B in FIG. 1A.

Figure 2A:
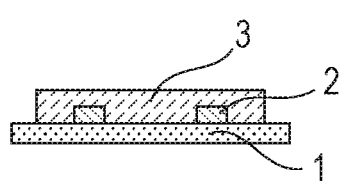
FIGS. 2A, 2B, 2C, 2D, 2E and 2F are process sectional views showing a production flow of an inkjet recording head pertaining to the present disclosure.

Onto a substrate 1 with energy generating elements 2, polymethyl isopropenyl ketone (manufactured by Tokyo Ohka Kogyo, trade name "ODUR-1010") as a positive resist to be the mold of an ink flow channel was applied to give a coating having a film thickness of 14 µm, and the coating was treated with heat at 120° C. for 6 minutes. Next, an exposure apparatus, UX3000 (manufactured by USHIO) was used to perform pattern exposure for the ink flow channel, and the exposed coating was developed with methyl isobutyl ketone (MIBK), giving a mold 3 of the ink flow channel (FIG. 2A).

Figure 2B:
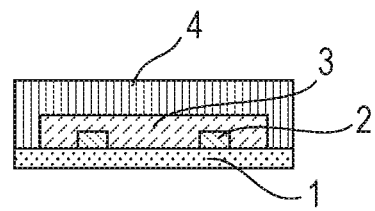
Figure 2C:
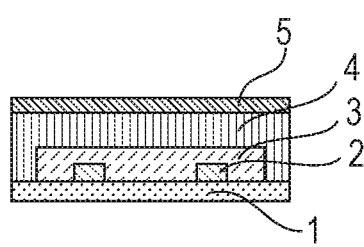

Next, as a resin layer 4 for forming ejection orifices, a photocurable resin liquid prepared by mixing materials shown in Table 1 was applied onto the ink flow channel mold 3 to give a coating having a film thickness of 25 µm from the underlying substrate 1. The coating was then treated with heat at 90° C. for 9 minutes (FIG. 2B). Onto the resin layer 4, a hydrophilic coating material shown in Table 2 was applied to give a coating having a film thickness of 0.5 µm, and the coating was treated with heat at 90° C. for 3 minutes, giving a hydrophilic coating film 5 (FIG. 2C).

TABLE 1

| Type | Trade name | Content (parts by mass) |
| --- | --- | --- |
| Epoxy resin | EHPE-3150 (manufactured by Daicel) | 100 |
| Additive | 1,4-HFAB[1] (manufactured by Central Glass) | 0 |
| Cationic photopolymerization agent | SP-172 (manufactured by ADEKA) | 6 |
| Silane coupling agent | A-187 (manufactured by GE Toshiba Silicones) | 5 |
| Solvent | Xylene (manufactured by Kishida Chemical) | 70 |

[1]1,4-Bis(hexafluoro-2-hydroxy-2-propyl)benzene

Figure 2D:
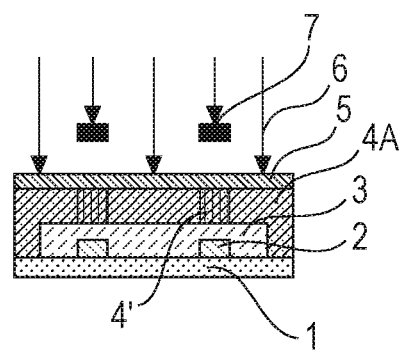
Figure 2E:
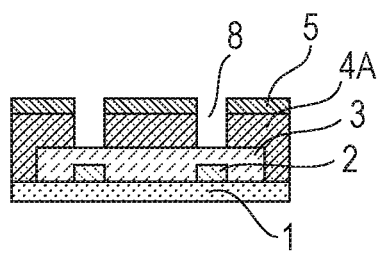

Next, with an i-ray exposure stepper (manufactured by Canon), exposure was performed by radiation energy 6 at an irradiation intensity of 2,500 J/m$^2$ through a photomask 7 such that the areas to be ejection orifices were unexposed areas 4' (FIG. 2D). The whole was further treated with heat at 90° C. for 4 minutes. Next, development was performed with xylene/MIBK=6/4 (mass ratio), giving ejection orifices 8 (FIG. 2E).

Figure 2F:
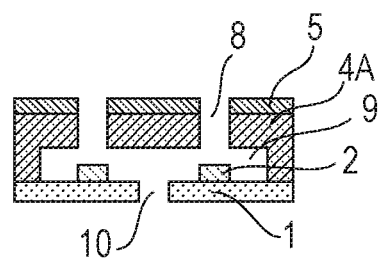

A mask (not shown) for forming an ink supply port was appropriately placed on the back face of the substrate, then the surface of the substrate was protected by a rubber film, and the silicon substrate was subjected to anisotropic etching to give an ink supply port 10. After completion of the anisotropic etching, the rubber film was removed, and the above exposure apparatus was used to irradiate the whole surface with ultraviolet light to decompose the ink flow channel mold 3. Methyl lactate was used to dissolve and remove the positive resist constituting the mold 3, and an ink flow channel 9 was formed (FIG. 2F).

In order to completely cure the resin layer (exposed portion of the resin layer) 4A and the hydrophilic coating film, heating process was then performed at 200° C. for 1 hour. Finally, electric connection and ink supply means were appropriately arranged to give an inkjet recording head.

Comparative Example 1

<Preparation of Coating Liquid of Hydrophilic Coating Material>
Preparation was not performed.
<Preparation of Hydrophilic Coating Film>
A substrate surface was subjected to plasma treatment in the conditions shown below to perform hydrophilization treatment of the substrate surface in place of a hydrophilic coating film.

Plasma Treatment
Apparatus: direct plasma treatment apparatus (product name: AP-T02, manufactured by Sekisui Chemical)
System: reduced pressure
Gas: $N_2/O_2$=50/50 (volume ratio)
Treatment time: 60 seconds
<Preparation of Inkjet Recording Head>
Ejection orifices were formed by the same method as in Examples 4 and 5 except that no hydrophilic coating film was formed, and then plasma treatment was performed in the above conditions. An inkjet recording head was prepared by the same method in Examples 4 and 5 except the above.

Comparative Example 2

<Preparation of Coating Liquid of Hydrophilic Coating Material>
At ordinary temperature (25° C.), 5.0 g of a surfactant (trade name: NSA-17, manufactured by Sanyo Chemical Industries) and 95.0 g of 3-trimethylsilylpropionic acid (manufactured by Tokyo Chemical Industry) were stirred for 1 hour to give a coating liquid of a hydrophilic coating material.
<Preparation of Hydrophilic Coating Film>
The same procedure as in Example 1 was performed to give a hydrophilic coating film.

Comparative Example 3

<Preparation of Coating Liquid of Hydrophilic Coating Material>
At ordinary temperature (25° C.), 5.0 g of sodium alginate (manufactured by Hayashi Pure Chemical Industry) and 95.0 g of ethanol having a purity of 95% (manufactured by Hayashi Pure Chemical Industry) were stirred for 1 hour to give a coating liquid of a hydrophilic coating material.
<Preparation of Hydrophilic Coating Film>
The same procedure as in Example 1 was performed to give a hydrophilic coating film.
<Measurement and Evaluation>
(Initial Hydrophilicity)
To evaluate the hydrophilicity of the prepared hydrophilic coating film, a micro contact angle meter (product name: DropMeasure, manufactured by Microjet) was used to determine the dynamic receding contact angle θr (°) to pure water. The results are shown in Table 2 as "initial contact angle".
(Wiping Evaluation)
As for wiping test, a diamond chip having a tip diameter of 15 μm was used as a scratching tool to scratch the ejection orifice surface of an inkjet recording head or a sample surface by reciprocation of the scratching tool 10 times at a pressing load of 10 gf between the scratching tool and the surface. The dynamic receding contact angle of the wiped sample to pure water was determined in the same procedure as above. The results are shown in Table 2 as "contact angle after wiping".
(Storage Evaluation)
To evaluate the storage stability, samples after storage of the hydrophilic coating films of Examples and Comparative Examples in an environment at 70° C. for 3 months were subjected to dynamic receding contact angle measurement to pure water in the same manner as above. The results are shown in Table 2 as "contact angle after storage at high temperature".
(Evaluation of Inkjet Recording Head)
To evaluate the prepared inkjet recording heads, printing performance was examined after the scratch test.

Examples 4 and 5: Satisfactory Printing Quality was Observed

Comparative Example 1: Many Printing Position Errors were Observed, and the Image Quality Greatly Deteriorated
Evaluation criteria of hydrophilicity and hydrophilic durability are as shown below:
Initial Hydrophilicity
A: The initial contact angle is less than 5°.
B: The initial contact angle is not less than 5° and less than 10°.

C: The initial contact angle is not less than 10° and less than 30°.

D: The initial contact angle is not less than 30°.

Hydrophilic Durability

A: Both the contact angle after wiping and the contact angle after storage at high temperature are less than 10°.

B: Either the contact angle after wiping or the contact angle after storage at high temperature, whichever larger, is not less than 10° and less than 20°.

C: Either the contact angle after wiping or the contact angle after storage at high temperature, whichever larger, is not less than 20° and less than 50°.

D: Either the contact angle after wiping or the contact angle after storage at high temperature, whichever larger, is not less than 50°.

As described above, the present disclosure enables the production of a hydrophilic coating material capable of giving a coated film having excellent hydrophilicity on the material surface and having excellent durability of hardness and hydrophilicity.

TABLE 2

|  |  | Example 1 | Example 2 | Example 3 |
|---|---|---|---|---|
| Step (A) | Alginate compound (parts) | Sodium alginate (5) | Potassium alginate (5) | Sodium alginate (5) |
|  | Silane compound 1 (parts) | 3-Trimethylsilylpropionic acid (95) | 3-Trimethylsilylpropionic acid (95) | N-(3-triethoxysilylpropyl)-4-hydroxybutyramide (95) |
|  | Silane compound 2 (parts) |  |  |  |
|  | Water (parts) | Ultrapure water (100) | Ultrapure water (100) | Ultrapure water (100) |
|  | Catalyst (parts) | Concentrated sulfuric acid (1) | Concentrated sulfuric acid (1) | Ni catalyst [1] (1) |
| Step (B) | Divalent metal salt | $CaCl_2$ | $CaCl_2$ | $CaCl_2$ |
| Other additives (parts) |  |  |  |  |
| Treatment after film formation |  |  |  |  |
|  |  | Evaluation |  |  |
| Initial contact angle [°] |  | 3 | 3 | 3 |
| Initial hydrophilicity evaluation |  | A | A | A |
| Contact angle after wiping [°] |  | 9 | 10 | 13 |
| Contact angle after storage at high temperature [°] |  | 10 | 11 | 12 |
| Hydrophilic durability evaluation |  | B | B | B |

|  |  | Example 4 | Example 5 |
|---|---|---|---|
| Step (A) | Alginate compound (parts) | Sodium alginate (5) | Sodium alginate (5) |
|  | Silane compound 1 (parts) | 3-Trimethylsilylpropionic acid (95) | 3-Trimethylsilylpropionic acid (95) |
|  | Silane compound 2 (parts) | 3-Glycidoxypropyltrimethoxysilane (25) | 3-Glycidoxypropyltrimethoxysilane (25) |
|  | Water (parts) | Ultrapure water (100) | Ultrapure water (100) |
|  | Catalyst (parts) | Concentrated sulfuric acid (1) | Concentrated sulfuric acid (1) |
| Step (B) | Divalent metal salt | $CaCl_2$ | $SrCl_2$ |
| Other additives (parts) |  | Cationic photopolymerization agent [2] (1) | Cationic photopolymerization agent [2] (1) |
| Treatment after film formation |  |  |  |
|  |  | Evaluation |  |
| Initial contact angle [°] |  | 3 | 3 |
| Initial hydrophilicity evaluation |  | A | A |
| Contact angle after wiping [°] |  | 6 | 5 |
| Contact angle after storage at high temperature [°] |  | 6 | 5 |
| Hydrophilic durability evaluation |  | A | A |

|  |  | Example 6 | Comparative Example 1 | Comparative Example 2 | Comparative Example 3 |
|---|---|---|---|---|---|
| Step (A) | Alginate compound (parts) | Propylene glycol alginate (5) |  |  | Sodium alginate (5) |
|  | Silane compound 1 (parts) | 3-Trimethylsilylpropionic acid (95) |  | 3-Trimethylsilylpropionic acid (95) |  |
|  | Silane compound 2 (parts) |  |  |  |  |
|  | Water (parts) | Ultrapure water (100) |  |  |  |
|  | Catalyst (parts) | Concentrated sulfuric acid (1) |  |  |  |
| Step (B) | Divalent metal salt | $CaCl_2$ |  |  |  |
| Other additives (parts) |  |  |  | Surfactant [3] (5) | Ethanol (95) |
| Treatment after film formation |  |  | Plasma treatment |  |  |

TABLE 2-continued

| | Evaluation | | | |
|---|---|---|---|---|
| Initial contact angle [°] | 3 | 5 | 30 | 28 |
| Initial hydrophilicity evaluation | A | B | D | C |
| Contact angle after wiping [°] | 18 | 30 | 50 | 48 |
| Contact angle after storage at high temperature [°] | 18 | 50 | 50 | 49 |
| Hydrophilic durability evaluation | B | D | D | C |

[1] Stabilized nickel catalyst "SN-250" (grade name, manufactured by Sakai Chemical Industry)
[2] Trade name "Adeka Optomer SP-172" (manufactured by ADEKA)
[3] Trade name "NSA-17", manufactured by Sanyo Chemical Industries While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-118518, filed Jun. 26, 2019, which is hereby incorporated by reference herein in its entirety.

What is claimed is:

1. A hydrophilic coating material comprising:
    an alginate compound having a bond with a silane compound;
    wherein the silane compound is bonded to a hydroxy group of the alginate compound.

2. The hydrophilic coating material according to claim 1, wherein the alginate compound is an alginate salt.

3. The hydrophilic coating material according to claim 2, wherein a cation of the alginate salt is a divalent metal ion.

4. The hydrophilic coating material according to claim 3, wherein the divalent metal ion is a calcium ion or a strontium ion.

5. The hydrophilic coating material according to claim 1, wherein the silane compound is at least one compound selected from the group consisting of an amide group-containing silane compound and a carboxyl group-containing silane compound.

6. The hydrophilic coating material according to claim 1, further comprising an epoxy group-containing silane.

7. The hydrophilic coating material according to claim 1, wherein the alginate compound is contained in an amount of 2 to 50% by mass relative to 100% by mass of the alginate compound and the silane compound in total.

8. A method for producing a hydrophilic coating material, the hydrophilic coating material including an alginate compound having a bond with a silane compound, the method comprising:
    a step of reacting a water-soluble alginate compound and the silane compound.

9. The method for producing a hydrophilic coating material according to claim 8, wherein the water-soluble alginate compound is selected from the group consisting of sodium alginate, potassium alginate, ammonium alginate and propylene glycol alginate.

10. The method for producing a hydrophilic coating material according to claim 8, wherein the silane compound has at least one of a carboxyl group and an amide group.

11. The method for producing a hydrophilic coating material according to claim 8, further comprising, after the step of reacting the water-soluble alginate compound and the silane compound, an ionically crosslinking step using a divalent metal ion.

12. The method for producing a hydrophilic coating material according to claim 8, wherein the silane compound has a carboxyl group, and in the step of reacting the water-soluble alginate compound and the silane compound, concentrated sulfuric acid is used as a catalyst.

13. An inkjet recording head comprising:
    a nozzle face; and
    a hydrophilic coating film on the nozzle face, the hydrophilic coating film including a hydrophilic coating material including an alginate compound having a bond with a silane compound;
    wherein the silane compound is bonded to a hydroxy group of the alginate compound.

14. The inkjet recording head according to claim 13, wherein the alginate compound is an alginate salt.

15. The inkjet recording head according to claim 14, wherein a cation of the alginate salt is a divalent metal ion.

16. The inkjet recording head according to claim 15, wherein the divalent metal ion is a calcium ion or a strontium ion.

17. The inkjet recording head according to claim 13, wherein the silane compound is at least one compound selected from the group consisting of an amide group-containing silane compound and a carboxyl group-containing silane compound.

18. The inkjet recording head according to claim 13, further comprising an epoxy group-containing silane.

* * * * *